United States Patent [19]

Lecerf

[11] 4,233,374

[45] Nov. 11, 1980

[54] DOUBLE CHROMATE COMPOSITIONS FOR USE AS POSITIVE ACTIVE MATERIAL IN BATTERIES

[75] Inventor: André Lecerf, Pace, France

[73] Assignee: SAFT-Societe des Accumulateurs Fixes et de Traction, Romainville, France

[21] Appl. No.: 30,051

[22] Filed: Apr. 13, 1979

Related U.S. Application Data

[63] Continuation-in-part of Ser. No. 952,089, Oct. 17, 1978, Pat. No. 4,184,016.

[30] Foreign Application Priority Data

Feb. 14, 1979 [FR] France .................................. 79 03772
Apr. 2, 1979 [FR] France .................................. 79 08198

[51] Int. Cl.$^3$ ............................................. H01M 6/14
[52] U.S. Cl. .................................... 429/194; 429/219; 423/595
[58] Field of Search ..................... 429/194, 218, 219; 423/597, 58, 595; 252/518

[56] References Cited

U.S. PATENT DOCUMENTS 3,853,627  12/1974  Lehmann et al. ................. 429/194 X
3,925,101  12/1975  Lehmann et al. .................... 429/194

FOREIGN PATENT DOCUMENTS 870616  3/1979  Belgium .

Primary Examiner—Charles F. LeFevour
Attorney, Agent, or Firm—Kenyon & Kenyon

[57] ABSTRACT

Novel double chromate compositions having the general formula:

$$MBi(Cr_xO_y)_2,$$

wherein M is silver or thallium and x is 1 and y is between about 3.7 and 4 or x is 2 and y is 7. Methods of making $MBi(Cr_xO_y)_2$ are characterized by reacting silver dichromate or thallium dichromate with a bismuth salt to provide equal numbers of silver or thallium atoms and bismuth atoms. Non-stoichiometric compositions wherein y is less than 4 and greater than or equal to about 3.7 are obtained by heating $MBi(CrO_4)_2$ to a temperature between about 200° C. and about 425° C., the resulting product having an unchanged radio crystallographic structure. These double chromate compositions have particular utility in batteries as active positive material. Due to the steadiness of discharge voltage and duration of discharge of batteries employing these double chromate compositions, such batteries are especially adapted for use in clocks and in cardiostimulators or pacemakers.

7 Claims, 6 Drawing Figures

DOUBLE CHROMATE COMPOSITIONS FOR USE AS POSITIVE ACTIVE MATERIAL IN BATTERIES

CROSS-REFERENCE TO OTHER APPLICATION

This is a continuation-in-part of application Ser. No. 952,089 filed on Oct. 17, 1978 now U.S. Pat. No. 4,184,016.

BACKGROUND OF THE INVENTION

This invention relates to new chemical compositions, and more particularly to double chromates having the formula $MM'(CrO_4)_2$ or $MM'(Cr_2O_7)_2$ or $MM'(CrO_x)_2$ where M and M' represent different metals and where x is less than 4 and greater than or equal to 3.7, to methods of making them, and to their use as positive active materials in batteries.

From the disclosure of French Pat. No. 2 110 765, a lithium battery is known having a nonaqueous electrolyte and positive active material constituting silver chromate having the formula $Ag_2CrO_4$. One of the great interests in this type of battery is that the reduction in metallic silver occurs, with sufficiently small currents, at a level of about 3 volts, with good yield and stability, so that such a battery can be used in applications such as clocks or cardio-stimulators. This active material has given fully satisfactory results, but it is relatively expensive.

Other chromates have been proposed as the active positive material for batteries, for example, chromates of copper, of iron, of cobalt, of nickel, of mercury, of thallium, and of bismuth, but aside from the fact that the existence of certain of these chromates is doubtful, their stability and discharge voltage would be inferior to the above-mentioned silver chromate.

SUMMARY OF THE INVENTION

The principal object of the present invention is to provide an improved positive active material for a battery having a nonaqueous electrolyte, and particularly for a battery having an alkaline metal or alkaline earth metal negative electrode, preferably lithium.

A further object of the invention is to provide a positive active material for such a battery which provides a discharge potential equivalent to that of silver chromate but which contains less silver, or even none at all.

The compositions which are the subject of the present invention are double-chromates of bismuth, which may have the general formula $MBi(CrO_4)_2$ or $MBi(Cr_2O_7)_2$, or $MBi(CrO_x)_2$, where M is a metal, preferably selected from the group consisting of silver, Ag, and thallium, Tl, and x is less than 4 and greater than or equal to about 3.7. The term double chromate, as used herein is intended to mean a double salt of bismuth of which the anion is formed of hexavalent chromium and oxygen, and which may be the chromate anion $CrO_4^{2-}$ or the bichromate anion $Cr_2O_7^{2-}$, or a nonstoichiometric chromate anion having the formula $CrO_x^{2-}$, where x is less than 4 and greater than or equal to about 3.7.

The invention equally concerns a process for the preparation of said bismuth double chromates, which process is characterized by the fact that it utilizes the reaction of a chromate, preferably silver dichromate or thallium dichromate, with a salt of bismuth, in a molar ratio providing one atom of bismuth per atom of silver or thallium.

In a particular process of this invention, using silver dichromate, the bismuth salt used is the chromate-dichromate, $Bi_2(CrO_4)_2Cr_2O_7$, and the reaction proceeds as follows:

$$Ag_2Cr_2O_7 + Bi_2(CrO_4)_2Cr_2O_7 \rightarrow 2AgBi(CrO_4)_2 + 2CrO_3.$$

In this particular embodiment, the reactants can be solid, moistened with a small quantity of solvent, and stirred at least intermittently. Preferably, the reaction mixture is heated. By way of example, water may be used as the solvent, using approximately one part by weight of water to two parts by weight of chromate-dichromate of bismuth.

Bismuth chromate-dichromate, itself, may be obtained by adding a bismuth salt, preferably in solid state, to an aqueous saturated solution of chromic anhydride, $CrO_3$. A bismuth salt which could be used is bismuth nitrate.

In another process of this invention, the salt of bismuth which reacts with the chromate, such as silver dichromate, may be a salt as soluble in water as bismuth nitrate, and the reaction takes place in a saturated solution of chromic anhydride $CrO_3$. The precipitate obtained consists essentially of double bichromate of silver and bismuth. It may be converted to the stoichiometric double chromate of silver and bismuth $AgBi(CrO_4)_2$ by treatment with water. The above-defined non-stoichiometric double chromate of silver and bismuth $AgBi(CrO_x)_2$, where $4 > X \geq 3.7$, can be obtained from the stoichiometric double chromate $AgBi(CrO_4)_2$ by heating the latter, preferably in an atmosphere containing oxygen, to a temperature between about 200° C. and about 425° C.

Thallium and bismuth double chromates can be obtained by the same processes by substituting thallium dichromate for silver dichromate.

Another object of the invention is the use of the above double chromates of silver and bismuth or thallium and bismuth as active materials in batteries. In accordance with this aspect of the invention, the double chromates of silver and bismuth or thallium and bismuth can be used as the positive active material in batteries having high specific energy, more especially, in lithium batteries with a nonaqueous electrolyte that is liquid at ordinary temperatures.

The invention can be better understood from the following illustrative non-limiting examples in conjunction with the drawings.

DETAILED DESCRIPTION OF THE PREFERRED EMBODIMENTS

Figure 1:
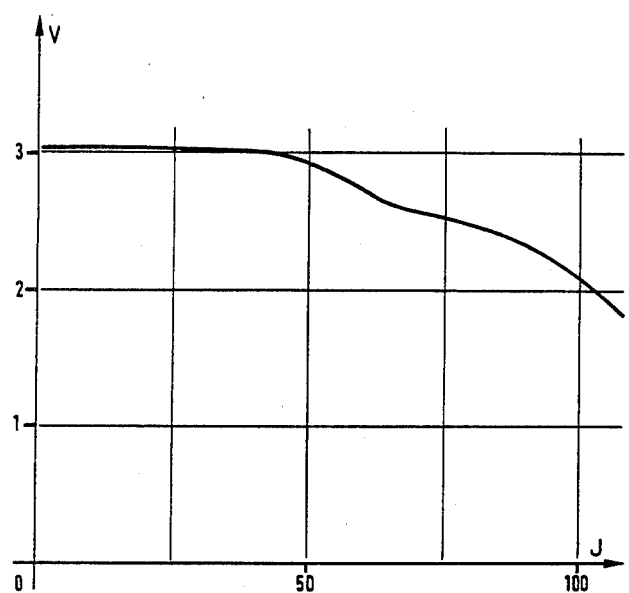
FIG. 1 represents a discharge curve of an electric cell according to the invention, in which the positive active material comprises a double chromate of silver and bismuth $AgBi(CrO_4)_2$.

By way of illustration and not as a limitation, methods of preparing each active material of the invention, starting with two examples of methods of preparation of a double chromate and a double bichromate of silver and bismuth, are described below in detail. The first example starts with bismuth chromate-dichromate, the chromate-dichromate being obtained by reaction of bismuth nitrate with $CrO_3$; the second example starts directly with bismuth nitrate and $CrO_3$.

EXAMPLE I

1. Preparation of Bismuth Chromate-Dichromate

A saturated, aqueous solution of chromic anhydride, $CrO_3$, is prepared at ambient temperature of about 20° C. To one liter of this solution is added 800 g of bismuth nitrate in solid form, having the formula $Bi(NO_3)_3 \cdot 5 H_2O$, while stirring continuously. The bismuth nitrate begins to dissolve in the solution of $CrO_3$, and after about one hour, an orange solid begins to precipitate. Precipitation is allowed to continue for approximately 24 hours. The orange precipitate is bismuth chromate-dichromate, $Bi_2(CrO_4)_2Cr_2O_7$.

The solution must be saturated with $CrO_3$, otherwise a basic chromate, $BiOHCrO_4$, will form. The indicated proportions (one liter of solution for 800 g of bismuth nitrate) have been determined to provide for effective agitation of the suspension. Taking account of the concentration of $CrO_3$ to achieve saturation (approximately 6 moles per liter), the proportions imply a large excess of $CrO_3$, which remains in solution and is not involved in the reaction. In fact, this excess would not be necessary if the nitrate of bismuth were added in solution form, but it would then be necessary to acidify that solution to avoid the precipitation of $BiOHCrO_4$.

Bismuth nitrate has been chosen from the readily available salts of bismuth because of its high solubility in water. It could be replaced by another soluble salt, for example, bismuth perchlorate.

The precipitate of $Bi_2(CrO_4)_2Cr_2O_7$ is separated by filtration and is washed on the filter, using 0.1 M solution of $CrO_3$ in N/10 nitric acid. The washing is terminated by placing the precipitate in suspension in acetone and refiltering the precipitate, then eliminating the acetone by drying.

The composition of the solution used to wash the precipitate was chosen to assure good elimination of ions in solution while avoiding at the same time dissolution and hydrolysis of the chromate-dichromate. The composition of this washing solution may be modified, but it is necessary to keep it acidic to avoid hydrolysis.

Analysis shows that the amounts of bismuth and chromium of the product are very close to theoretical values corresponding to the formula $Bi_2(CrO_4)_2Cr_2O_7$.

2. Preparation of Double Chromate

This process of the present invention consists of reacting bismuth chromate-dichromate with silver dichromate.

It is to be noted that the preparation of $Bi_2(CrO_4)_2Cr_2O_7$ has been described in detail above in order to facilitate reproduction of the invention, this product not being available currently. But the chromate-dichromate of bismuth may be utilized in the process of the present invention independently of its manner or method of preparation.

As to silver dichromate, it can be prepared, by way of a nonlimiting example, in the manner described in U.S. Pat. No. 4,032,624, incorporated by reference.

The reaction that takes place is the following:

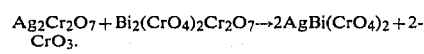

$$Ag_2Cr_2O_7 + Bi_2(CrO_4)_2Cr_2O_7 \rightarrow 2AgBi(CrO_4)_2 + 2CrO_3.$$

The procedure is to mix, in equimolar quantities, silver dichromate and bismuth chromate-dichromate, adding 1 part by weight of water for two parts by weight of bismuth chromate-dichromate. The resulting paste is heated to a temperature between 100° C. to 200° C. for 24 to 48 hours, depending upon the effectiveness of agitation.

To prepare a small quantity of the product (several tens of grams) the simplest method is to place the reaction mixture in a pyrex tube. To this is added several pyrex marbles or small balls; the tube is then sealed and maintained at 200° C. for 48 hours, being agitated two or three times.

To prepare a larger quantity, the simplest method is to use an unsealed reactor at a temperature of approximately 100° C. 24 hours of reaction time at this temperature is sufficient if an effective and constant agitation is maintained.

The reaction temperature can be chosen anywhere between 100° C. to 200° C. At higher temperatures, parasitic phenomena of oxidation-reduction will appear. It is also possible to operate or to effect the reaction at lower temperatures, but the reaction then proceeds more slowly.

The reaction will not take place dry; it is necessary to moisten the mixture with a solvent, the simplest being water. The quantity of water used in the reaction must be sufficiently low to avoid hydrolysis, yet enough is needed to well moisten the reactants. The quantity indicated above constitutes a good compromise. Alternatively, water can be replaced by another solvent of the reactants that is sufficiently inert with respect to them and to the resulting double chromate of silver and bismuth. Taking into account that it is sufficient to dissolve traces of the reactants, a number of liquids can be used. For example, acetic acid has been tried with success.

When the reaction is finished, the mixture is placed on a filter, and the concentrated solution of $CrO_3$ is eliminated by a brief washing with a solution of N/10 nitric acid. The product is then removed from the filter, washed with a large quantity of cold water and filtered again. This wash can be repeated several times, after which the double chromate of silver and bismuth, $AgBi(CrO_4)_2$ is dried at 150° C. for about 24 hours.

The following table compares the composition found in two samples to theoretical values corresponding to the formula $AgBi(CrO_4)_2$.

|  | Silver | Bismuth | $CrO_4$ |
| --- | --- | --- | --- |
| Theoretical Values | 19.66% | 38.08% | 42.26% |
| Experimental Value - Run 1 | 19.74 | 37.97 | 42.10 |
| Experimental Value - Run 2 | 19.77 | 38.12 | 42.35 |

As can be seen, the experimental values correspond perfectly with the theoretical values.

If during the preparation of the double chromate the reactants are not in stoichiometric proportions, the product will be contaminated with either $BiOHCrO_4$ or $Ag_2Cr_2O_7$, depending upon whether there is an excess of bismuth or an excess of silver. These impurities may or may not be acceptable, depending upon the purpose or ultimate use of the product. In particular, in using the product in an electrochemical generator, which will be described herein below and which also constitutes an object of this invention, silver dichromate should be avoided due to its solubility in organic solvents, while the presence of $BiOHCrO_4$ does not appear troublesome.

EXAMPLE II

Solid bismuth nitrate, $Bi(NO_3)_3, 5H_2O$ is added to a saturated, aqueous solution of $CrO_3$ at 20° C. The bismuth nitrate is added in the proportion of 800 g to one liter of solution. The mixture is agitated for about one hour; then enough silver dichromate is added by small fractions to the solution to make the molar ratio of silver to bismuth equal to one, that is, 356 g for every 800 g of bismuth nitrate. The reaction mixture is stirred, preferably for a period of about 24 hours, to obtain the best yield, which is about 95%. The reaction product is then filtered and washed with a solvent such as acetone or tetrahydrofuran (water provokes hydrolysis) and then dried, preferably in a vacuum chamber, to recover the solid part, which is essentially a double bichromate of silver and bismuth.

To obtain the stoichiometric double chromate, the recovered solid is then simply washed with water. The washing transforms the solid into $AgBi(CrO_4)_2$, with the elimination of dissolved $CrO_3$. The solubility of $AgBi(CrO_4)_2$ being extremely slight, the end of the wash is indicated by the disappearance of the orange color characteristic of solutions of $CrO_3$.

The stoichiometric double bichromate and chromate of thallium and bismuth may be obtained by the same method, by substituting the corresponding quantity of thallium bichromate for the silver bichromate.

All of the preceding operations are effectively carried out at ambient temperatures. The product recovered will consist of particularly fine granules. The yield with respect to the starting reactants, in the case of bismuth nitrate and silver dichromate, is better than 95%.

In this variant of the method, the order of introducing the reactants is not critical. The silver or thallium dichromate may be mixed first with the solution of $CrO_3$, then the bismuth nitrate added, or the dry ingredients may be well mixed and then the solution of $CrO_3$ added to the mixture. It is only necessary to avoid, as in the preparation of bismuth chromate-dichromate, placing the bismuth nitrate in the presence of water, unless the water is in the form of a saturated solution of $CrO_3$ or some other sufficiently acidic solution, to avoid hydrolysis of the bismuth nitrate. Likewise, it is preferable not to heat before the precipitation of the double dichromate has been achieved. Of course, here also the bismuth nitrate can be replaced by another soluble salt of bismuth. The required precision of the molar ratio of bismuth salt to silver dichromate or thallium dichromate depends on the degree of purity desired for the end product.

Generally in the process of the invention, it is necessary to take into account the tendency of bismuth salts to hydrolyze. On the other hand, the double salts of silver and bismuth or thallium and bismuth are not hydrolyzable, which is why, in particular, the treatment with water of the dichromate double can be done without special precautions.

Within the limits thus fixed, other modifications of the invention can be made without departing from the spirit and scope of the invention.

From the point of view of crystallography, $AgBi(CrO_4)_2$ is an isomorph of scheelite, $CaWO_4$, which implies that silver and bismuth are randomly distributed at the sites corresponding to those of calcium is scheelite.

Several crystallographic characteristics are given below:

Formula Pattern—$Ag_{\frac{1}{2}} Bi_{\frac{1}{2}} CrO_4$
Spatial Grouping—$I\ 4_{1/4}$ (N°88)
Parameters—a = 5.10 Å, c = 11.85 Å
Number of Formula Patterns per Lattice—z = 4
Calculated Specific Mass—5.91
Measured Specific Mass—5.79

As mentioned above, the materials of the invention also include non-stoichiometric double chromates $MBi(CrO_x)_2$, where M is silver or thallium, and x is less than 4 and greater than or equal to about 3.7. It has been discovered that such double chromate compositions can exist without loss of the crystalline structure of the stoichiometric double chromates, through a process involving a slight loss of oxygen.

In particular, the non-stoichiometric double chromate compositions of the present invention can be obtained from a stoichiometric double chromate composition (e.g., $AgBi(CrO_4)_2$) by heating the latter to a temperature between about 200° C. and about 425° C., and preferably between about 325° C. and 425° C.

The use of the double chromates of silver or thallium and bismuth in batteries avoids the drawbacks of the proposed prior art chromate materials by furnishing a positive active material less expensive than silver chromate but which also discharges at the same level as the latter during at least one part of the discharge. On the other hand, the solubility of the double chromates of silver or thallium and bismuth in organic solvents is much less than that of silver chromate, which lower solubility is more favorable to long battery life under conditions of prolonged keeping or of discharge to a very low state.

Advantageously, the solvent of the electrolyte is an aprotic composition, and the positive active material formed from the double chromates of silver or thallium and bismuth includes an added electrical conductor.

In the case of $AgBi(CrO_4)_2$, this positive active material is discharged by the transformation of silver and bismuth to the metallic state. The discharge employs 4 electrons, one for the monovalent silver and 3 for the trivalent bismuth. It can be observed that the voltage of such a battery stays at a level corresponding to the discharge voltage of silver for twice the time needed for discharge of the silver; that is to say, during the time of utilization of two electrons. A part of the bismuth discharges, therefore, at the level of silver, although the theoretical oxidation-reduction potential of bismuth is inferior by approximately 0.7 volts to that of silver. Accordingly, for an equal discharge, a salt can be used which contains only half the quantity of silver, with a resulting economy.

The utilization of double chromates of silver or thallium and bismuth according to the invention will be better understood from the examples described below as illustrated by the drawings, which represent the discharge curves of batteries made according to this invention.

With reference to FIG. 1, button-type batteries have been prepared with a cathode made of a mixture of double chromate of silver and bismuth $AgBi(CrO_4)_2$, 97% by weight; carbon black, 1% by weight; and graphite, 2% by weight. In these batteries, the cathode has a thickness of 0.2 cm. and a cross-section of 1.01 $cm^2$, which corresponds to a theoretical capacity (computed from the reduction of silver and bismuth to the metallic state) of 116 mAh. A separator, made of a cellulose felt soaked with a molar solution of lithium perchlorate in propylene carbonate, is disposed on the cathode. The negative electrode is a pellet of lithium.

These batteries have been discharged across a resistance of 62,000 ohms at a temperature of 37° C.

In FIG. 1, a typical discharge curve is represented having as abscissa the time of discharge J, in days, and as ordinate the voltage V, in volts, of the battery. As one can see from the figure, taking 2.9 volts as the end voltage of discharge (which corresponds to use in a cardio-stimulator, the temperature of discharge being equally chosen in view of this application), the capacity supplied by the battery is 58 mAh; that is to say one-half of the theoretical capacity. Considering that the capacity due to the reduction of the silver into silver metal is one-fourth of the theoretical capacity, it can be seen that a part of this capacity is due to the bismuth, even though the discharge voltage remains the same as that of silver chromate. The results obtained are, therefore, the same as those which would have been obtained with double the quantity of silver.

For those applications which do not require such a constant voltage, it can be observed that by taking the end voltage as 2.5 volts, the discharge capacity becomes 85 mAh, for a yield of 73%. In this case, the results are close to those which would be obtained with three times the quantity of silver.

Thus, the economy which can result from employing the double chromate of silver and bismuth can be seen.

It must be emphasized that the double chromate of silver and bismuth is in no way the equivalent to a mixture of silver chromate and bismuth chromate. With such a mixture, the silver chromate would be reduced at 3 volts and the chromate of bismuth at its own voltage level, which is clearly inferior.

In the preceding example, the electrolyte is a molar solution of lithium perchlorate in propylene carbonate. Other electrolytes can be used with comparable results, and in particular the electrolytes having as solvents those which are mentioned in French Pat. No. 2 122 011 or dioxolane. The concentration of solutes can be varied as well.

The electrical conductor used in the above example, a mixture of carbon black and graphite, can be replaced by another conductor; carbon black can equally be used alone, or with the addition of fluorinated graphite or yet graphite alone, or any appropriate metal. The addition of graphite or fluorinated graphite to the carbon black is designed to facilitate compression of the active material, principally in batteries of the button type, which has the advantage of compressing the pulverized or powdered positive active material in the cup, both to improve the contact between the grains and to increase the quantity of materials used, and accordingly the capacity of the battery.

Figure 2:
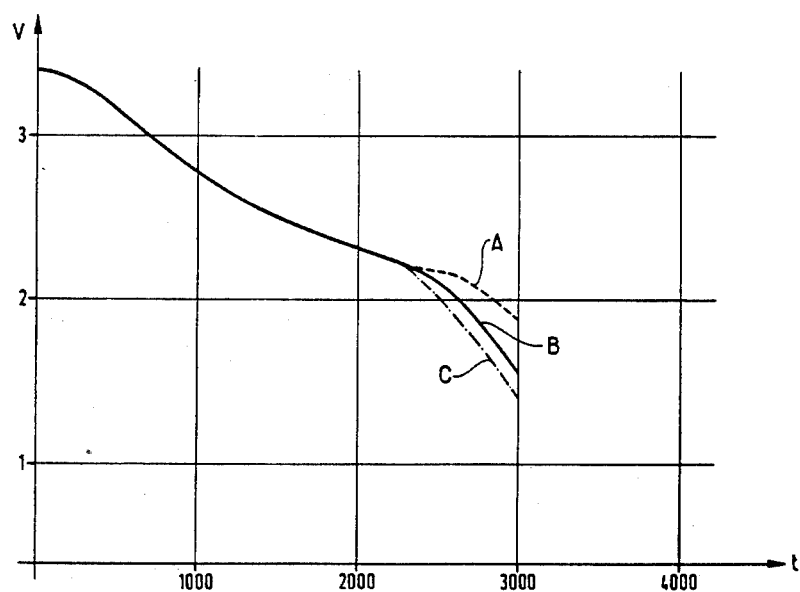
FIG. 2 represents discharge curves of electric batteries according to the invention, in which the positive active material comprises the double bichromate of silver and bismuth $AgBi(Cr_2O_7)_2$.

Referring next to FIG. 2, the curves A, B, and C relate to the discharge of three electric cells, of the button type frequently designated by the numerical symbol 44, that is to say having a diameter of 11.4 mm and a height of 5.35 mm, in which the quantity of positive active material is diminished in comparison to commercial batteries of this type, with the difference being compensated by a shim.

In each of the cells A, B, and C, the positive active material comprises the double bichromate of silver and bismuth $AgBi(Cr_2O_7)_2$. In particular, they contain 130 mg of an active mass composed of 95% by weight of said bichromate and 5% by weight of graphite. The active mass is compressed by a force of 1.5 tons to obtain a thickness of 0.6 mm, the surface area of the electrode being 0.6 $cm^2$. The negative electrode contains a substantial excess of lithium in comparison with the capacity of the positive electrode. The electrolyte is a molar solution of lithium perchlorate in propylene carbonate.

In FIG. 2, the battery voltage V, in volts, is plotted as a function of time t, in hours, for discharge of these batteries across a resistance of 15 k-ohms and at a temperature of 37° C. The capacity obtained is 30 mAh until the output voltage falls to 2.5 volts for the three cells, and 45 to 50 mAh until the output falls to 2 volts. The corresponding capacities per unit mass are comparable to those obtained with silver chromate.

Figure 3:
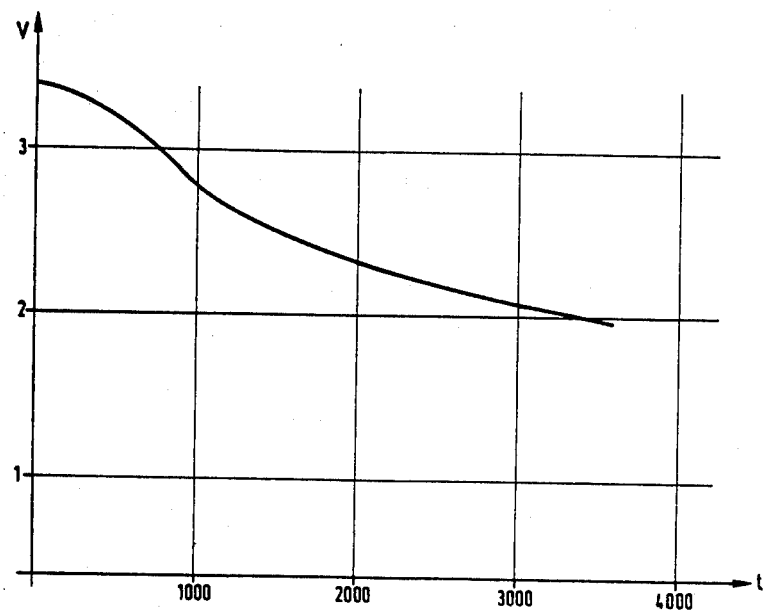
FIG. 3 represents a discharge curve of an alternative battery according to the invention, in which the positive active material comprises the double bichromate of thallium and bismuth $TlBi(Cr_2O_7)_2$.

In FIG. 3, the curve illustrates the discharge of a battery containing the double bichromate of thallium and bismuth $TlBi(Cr_2O_7)_2$ as the positive active material. This battery differs from those described above only in the nature of its positive active material and in that the quantity of the positive active mass is 200 mg. The figure shows the discharge curve for this battery across a resistance of 150 k-ohms at ambient temperature. The capacity obtained is 30 mAh until 2.5 volts is reached and 54 mAh until 2 volts is reached.

Figure 4:
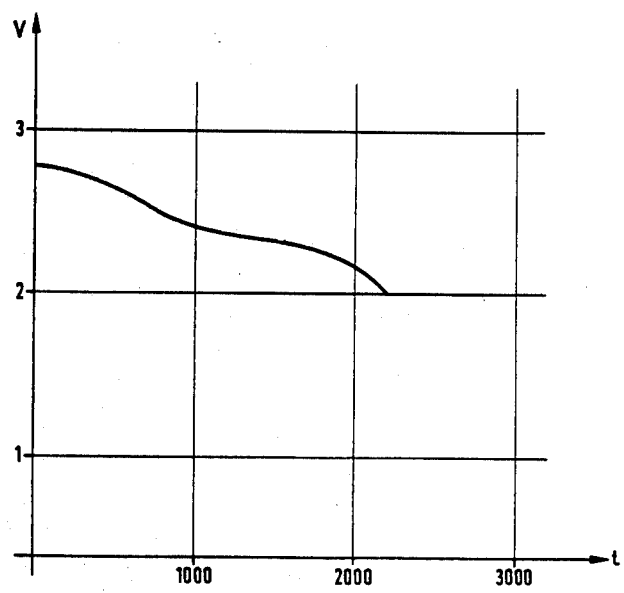
FIG. 4 represents a discharge curve of another alternative battery according to the invention, in which the positive active material comprises the double chromate of thallium and bismuth $TlBi(CrO_4)_2$.

FIG. 4 shows a discharge curve E of a battery containing thallium and bismuth double chromate $TlBi(CrO_4)_2$. This battery has the same geometrical characteristics as the preceding ones, but the quantity of the positive active mass is 560 mg, of which 5% by weight is graphite. In this case, discharge has been across a resistance of 62 k-ohms at ambient temperature. The discharge voltage is inferior to that of the preceding batteries, but is sufficient for those applications which require only an operating voltage greater than 2 volts. For this end voltage a capacity of 85 mAh is obtained.

Figure 5:
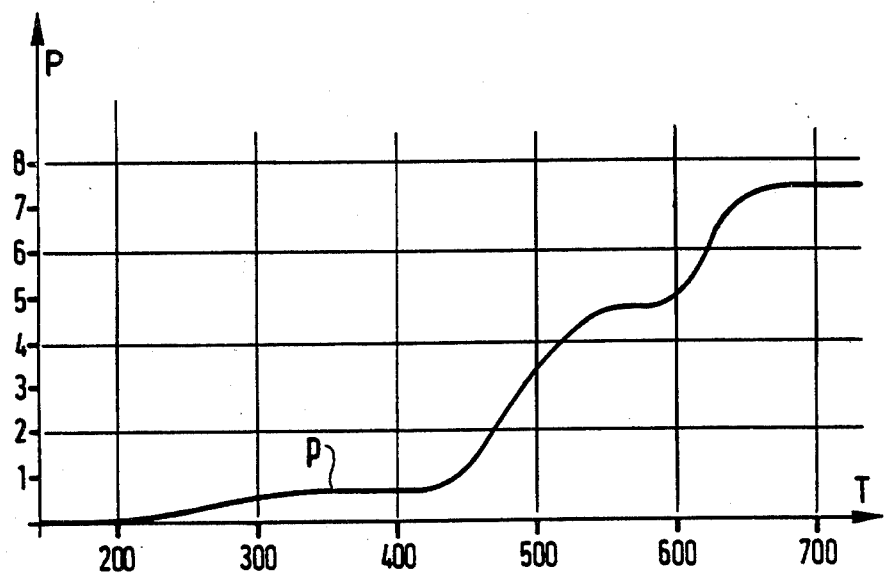
FIG. 5 is a diagram of weight loss versus temperature for $AgBi(CrO_4)_2$.

With reference next to FIG. 5, the curve in this figure represents the percentage weight loss P (on the ordinate) as a function of the temperature T in degrees Celsius (on the abscissa) of a sample of $AgBi(CrO_4)_2$ subjected to an increasing temperature at the rate of 300° C. per hour in an oxygen atmosphere at atmospheric pressure. A first stage of weight loss commences at about 200° C. and continues until about 325° C., after which a first plateau (reference p on the curve) can be observed. This plateau persists up to about 425° C.; then the weight loss resumes.

The product obtained between the start of the first stage of weight loss and the plateau p is a nonstoichiometric double chromate of the invention having the formula $AgBi(CrO_x)_2$, where x is less than 4. The lower limit of x is the value corresponding to the plateau p, which has been calculated as about 3.7, based on a weight loss of about 0.88 percent.

X-ray diagrams of the product thus obtained are substantially identical to those for AgBi(CrO$_4$)$_2$, which shows that the loss of oxygen has occurred without changing the crystalline structure. On the other hand, beyond the plateau p the radiocrystallographic analysis shows the appearance of a new phase.

This transformation from the stoichiometric to a nonstoichiometric double chromate can be accomplished in an atmosphere other than pure oxygen, in particular in a neutral gas with or without the addition of oxygen, for example in air. The theory indicates that the process of oxygen loss is practically independent of the partial pressure of oxygen under which the product is obtained.

Experience has thus confirmed that samples of AgBi(CrO$_4$)$_2$ heated in air to 350° C. undergo a loss in weight of 0.88% without changing their crystalline structure. If the treatment temperature is limited to the range between about 200° C. and about 325° C., a double chromate AgBi(CrO$_x$)$_2$ is obtained in which x falls between 4 and about 3.7.

Figure 6:
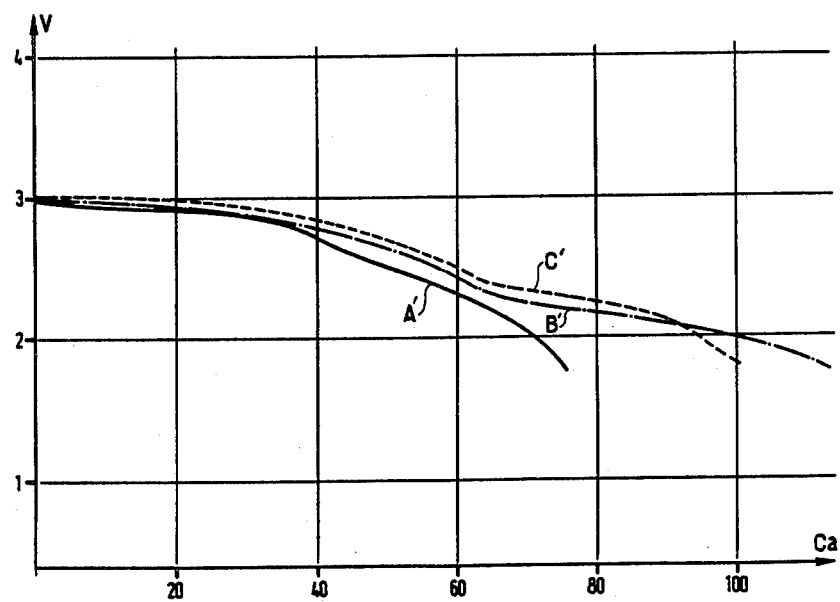
FIG. 6 represents discharge curves of electric batteries in which the positive active material is either a stoichiometric double chromate of silver and bismuth or a non-stoichiometric double chromate of silver and bismuth.

The curves of FIG. 6 represent, for three batteries of the button type, designated by the letters A', B', and C', the output in volts V as a function of the fraction in percent of capacity Ca discharged in the course of discharging the batteries across a resistance of 62 k-ohms. For calculating the fraction of capacity discharged, a theoretical capacity was assumed corresponding to 5 faradays per mole of positive active material, this being 1 faraday per gram-atom of silver and 2 faradays per gram-atom of chromium.

Battery A' of FIG. 6 contained 600 mg. of a positive active mass composed of, by weight, 95% AgBi(CrO$_4$)$_2$ and 5% graphite. Battery B' contained 150 mg of the same composition, and battery C' contained 400 mg of a positive active mass composed of, by weight, 95% AgBi(CrO$_x$)$_2$ obtained by heating in air at 350° C., and 5% graphite.

These three batteries had the following common characteristics; external diameter 11.4 mm; height 5.35 mm; active surface of the electrode 0.6 cm$^2$; positive active mass compressed under a force of 1.5 tons; a lithium negative electrode with a theoretical capacity exceeding that of the positive electrode; and 120 microliters of an electrolyte consisting of a molar solution of lithium perchlorate in propylene carbonate.

The three discharge curves are referenced by the three letters designating the corresponding batteries. As can be seen from FIG. 6, although battery C' contains a quantity of positive active material intermediate between those of cells A' and B', its voltage output is superior to the latter during almost all of the discharge, which shows that the non-stoichiometric double chromate of the invention is also a desirable positive active material for batteries.

I claim:

1. A composition comprising a double chromate of bismuth taken from the group consisting of AgBi(CrO$_x$)$_2$, AgBi(Cr$_2$O$_7$)$_2$, TlBi(CrO$_4$)$_2$, and TlBi(Cr$_2$O$_7$)$_2$, where x is equal to or greater than 3.7 and less than 4.

2. A battery having a positive electrode, a negative electrode selected from the group consisting of alkaline metals and alkaline earth metals and a nonaqueous electrolyte, wherein the positive electrode comprises as active material a double chromate of bismuth taken from the group consisting of AgBi(CrO$_x$)$_2$, AgBi(Cr$_2$O$_7$)$_2$, TlBi(CrO$_4$)$_2$, and TlBi(Cr$_2$O$_7$)$_2$, where x is equal to or greater than 3.7 and less than 4.

3. A battery as recited in claim 2 further comprising an alkali metal as the negative electrode, and an electrolyte which is a liquid solution at ambient temperatures of about 20° C., the solvent being an aprotic composition, and the positive active material including an added electrical conductor.

4. A battery as recited in claim 3 wherein the alkali metal negative electrode is lithium.

5. A battery as recited in claim 3 wherein the added electrical conductor comprises carbon black.

6. A battery as recited in claim 3 wherein the added electrical conductor comprises a mixture of carbon black and graphite.

7. A battery as recited in claim 3, 4, 5 or 6 wherein the electrolyte is a molar solution of lithium perchlorate in propylene carbonate.

* * * * *